United States Patent [19]

Daoud

[11] Patent Number: 5,796,039

[45] Date of Patent: Aug. 18, 1998

[54] WEATHERPROOFING OF ELECTRICAL CONNECTIONS WITH TERMINALS ON OUTDOOR PANELS

[75] Inventor: Bassel H. Daoud, Parsippany, N.J.

[73] Assignee: Lucent Technologies Inc., Murray Hill, N.J.

[21] Appl. No.: 718,111

[22] Filed: Sep. 18, 1996

[51] Int. Cl.⁶ .................................................. H10R 9/22
[52] U.S. Cl. .................................... 174/59; 439/936
[58] Field of Search ........................... 174/59, 52.2, 50.5, 174/50.59, 50.62; 361/822, 823, 826; 439/519, 521, 936; 379/399

[56] References Cited

U.S. PATENT DOCUMENTS

| | | |
|---|---|---|
| 4,403,106 | 9/1983 | Lask et al. .......................... 174/59 |
| 5,239,128 | 8/1993 | Golden et al. ....................... 174/50 |
| 5,363,440 | 11/1994 | Daoud ............................. 379/369 |

*Primary Examiner*—Kristine L. Kincaid
*Assistant Examiner*—Joseph Waks

[57] ABSTRACT

Electrical connections with terminals on a protector module mounting panel are protectively shielded from the effects of moisture condensation and other deleterious environmental conditions. The panel is placed in a housing having a top opening and a bottom opening, and wire leads are connected to the terminals. A pan member is placed across the bottom opening of the housing, to define a clearance gap between the pan member and the housing. The wire leads are routed through the clearance gap, and the connection terminals are protectively shielded by a sealant material which may be poured into the pan member from outside the panel housing through the defined clearance gap, and allowed to harden.

10 Claims, 5 Drawing Sheets

1

WEATHERPROOFING OF ELECTRICAL CONNECTIONS WITH TERMINALS ON OUTDOOR PANELS

BACKGROUND OF THE INVENTION

1. Field of the Invention

The present invention relates to weatherproofing of electrical connections, and particularly to a weatherproof arrangement for a telephone line protector module panel that is to be located outdoors.

2. Discussion of the Known Art

Outside telephone wire lines are interfaced with customer lines in a home or building, through so-called building entrance protector (BEP) terminals. BEP terminals include a protector module mounting panel to which a number of voltage surge protector modules are connected. Each module typically has five pins, and is mounted with the other modules on one side of the panel. The module pins are received in portions of connection terminals that are fitted in thru-openings in the panel. Connecting portions of the terminals project from a side of the panel opposite the side on which the modules are mounted. Leads for connecting the protector modules with the outside wire lines and the customer lines, are wire-wrapped about the connecting portions of the panel terminals.

Most BEP terminals and protector module panels are designed for indoor applications only. Yet, it is sometimes necessary to mount a BEP terminal outdoors where the environment has a negative effect on electrical connections at the panels and on the protector modules themselves. For example, humidity will cause condensation between the module pins and the connecting terminals on the panels. Such moisture also degrades the integrity of the electrical connections between the panel terminals and the wire leads that are wrapped or otherwise connected on them.

A need therefore exists for a BEP terminal that can be mounted outdoors, while the connection terminals on the module panel and the surge protector modules themselves, are protectively shielded from the effects of outdoor environmental conditions.

SUMMARY OF THE INVENTION

According the invention, a method of protecting electrical connections with terminals on a component mounting panel from environmental conditions, includes placing a component mounting panel having connection terminals inside a housing having a top opening and a bottom opening. Wire leads are connected to the connection terminals, and a pan is placed across the bottom opening of the housing to define a clearance gap between the pan and the housing. The method also includes routing the wire leads through the clearance gap, and pouring a sealant material through the clearance gap into the pan such that the sealant material seals the bottom opening of the housing and protectively shields the connection terminals.

According to another aspect of the invention, an environmentally shielded module panel assembly comprises a panel housing having a top opening and a bottom opening, a panel having connection terminals for mounting a number of component modules having pins adapted to make electrical contact with corresponding ones of the connection terminals of the panel, and the panel is mounted in the panel housing. A number of wire leads are connected to the connection terminals, a pan is supported across the bottom opening of the panel housing wherein a clearance gap is defined

2 between the pan and the panel housing, and the wire leads are routed through the clearance gap. A sealant material is poured through the clearance gap into the pan such that the botton opening of the panel housing is sealed and the connection terminals are protectively shielded from environmental conditions.

For a better understanding of the present invention, reference is made to the following description taken in conjunction with the accompanying drawing, and the scope of the invention will be pointed out in the appended claims.

DETAILED DESCRIPTION OF THE INVENTION

Figure 1:
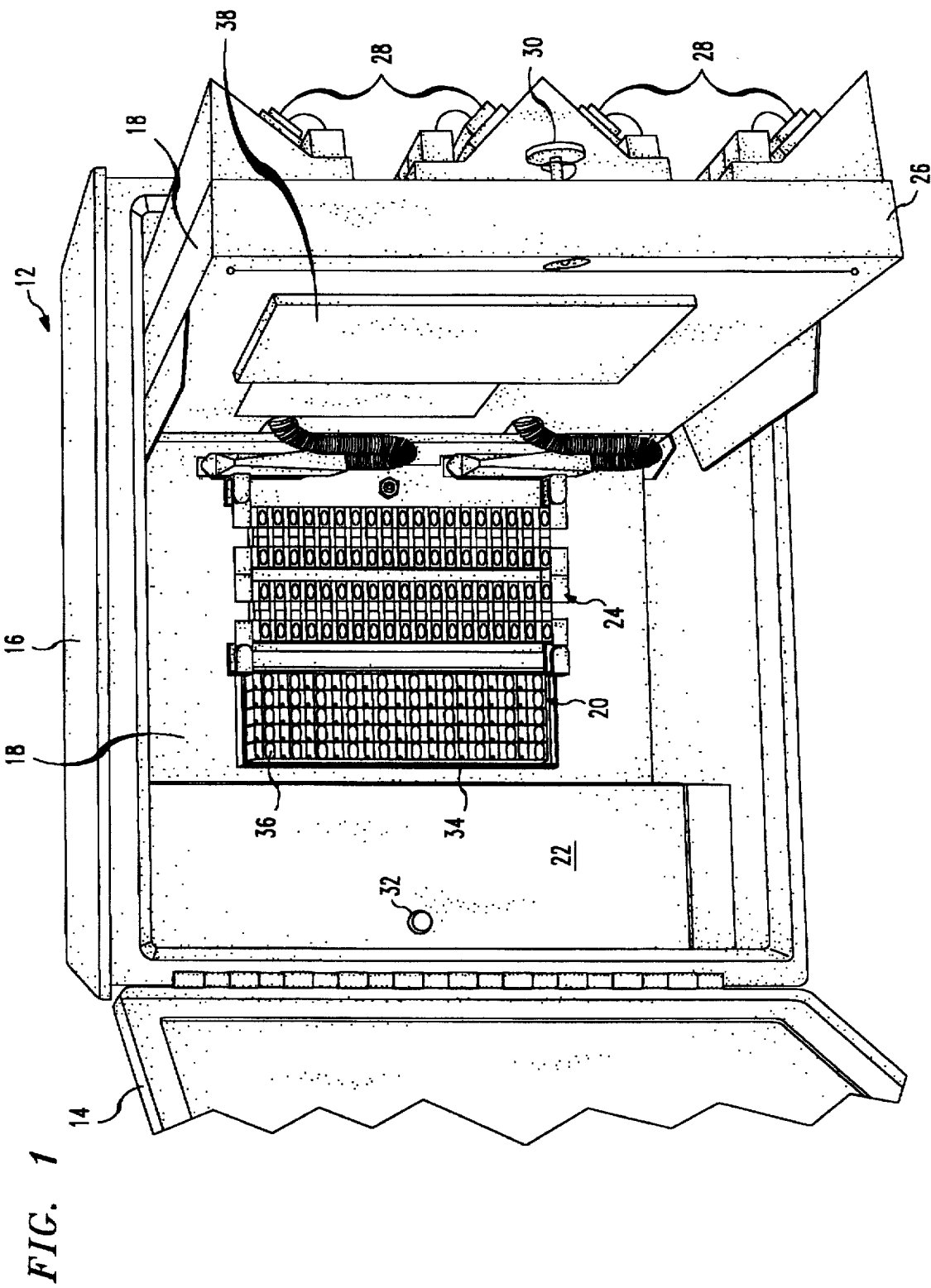
FIG. 1 perspective view of a building entrance protector (BEP) terminal suitable for mounting outdoors, according to the invention.

FIG. 1 is a perspective view of a building entrance protector (BEP) terminal suited for mounting outdoors, according to the invention. The terminal includes a cabinet 12 made of rust-proof metallic or durable plastics material. The cabinet 12 has a hinged outer cover 14 that closes against a main body 16 of the cabinet 12, so that the cabinet body 16 forms a protective enclosure for a BEP chassis 18 with associated components. The BEP chassis 18 supports a protector module panel assembly 20, a covered splice chamber 22 at the left side of the chassis 18 as viewed in FIG. 1, and a set of output connectors 24 at the right of the panel assembly 20.

An inside BEP chassis cover layer 26 is hinged at the right side of the BEP chassis 18 as viewed in FIG. 1. The cover layer 26 supports a number of customer bridge terminals 28 on its outer surface, which terminals 28 are accessible by a customer when opening the outer cover 14 of the BEP cabinet 12. The BEP cover layer 26 has an associated security lock mechanism 30 which engages the BEP chassis 18 through an opening 32 in the cover of the splice chamber 22.

The protector module panel assembly 20 includes a panel housing 34 having side walls that form a generally rectangular frame. The housing walls extend a certain height above the chassis, and line protector modules 36 are surrounded by the housing walls. See FIG. 5.

A generally rectangular, flat sealing gasket 38 is adhered on an inner surface of the cover layer 26. The gasket 38 is positioned such that when the cover layer 26 is closed, portions of the gasket 38 near its periphery are aligned flush against upper edges of the side walls of the panel housing 34, thus sealing the top opening of the panel housing 34 and preventing moisture from reaching the modules 36 through the housing top opening.

Figure 2:
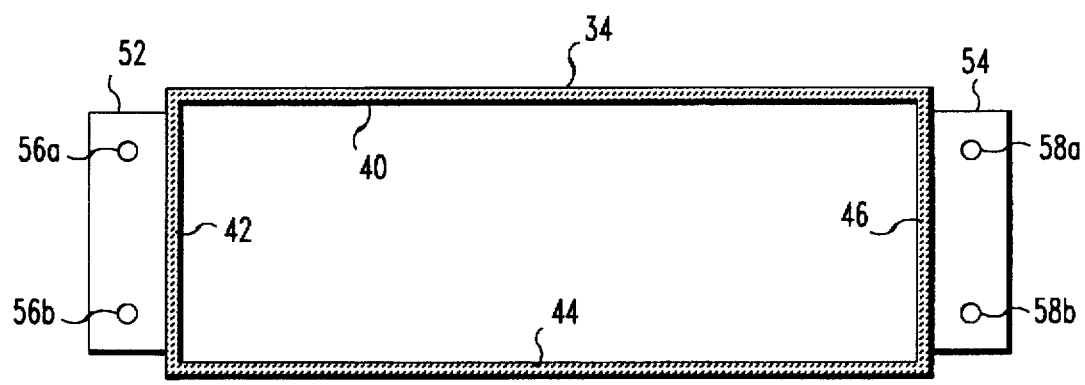
FIG. 2 is a top view of a protector module panel housing in the BEP of FIG. 1.
Figure 3:
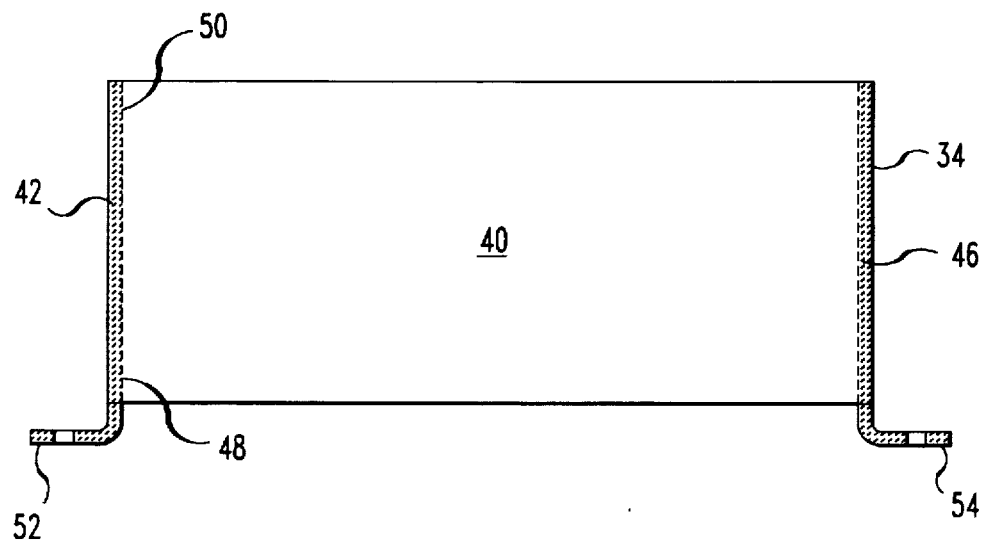
FIG. 3 is a side view of the panel housing in FIG. 2.

FIG. 2 is an enlarged, top view of the module panel housing 34 in FIG. 1; and FIG. 3 is a side view of the panel housing 34 in FIG. 2. The housing 34 is formed of corrosion-resistant sheet metal such as aluminum or stainless steel, and has four side walls 40, 42, 44, and 46 which define a generally rectangular frame having a bottom opening 48 and a top opening 50 (FIG. 3). Side wall 42 has a base flange 52 that stands at a right angle from the wall 42 as viewed in FIG. 3, and side wall 46 has a base flange 54 that stands at a right angle from the bottom of the wall 46. A pair of mounting holes 56a, 56b are formed in the base flange 52, and a pair of mounting holes 58a, 58b are formed in the base flange 54.

Figure 4:
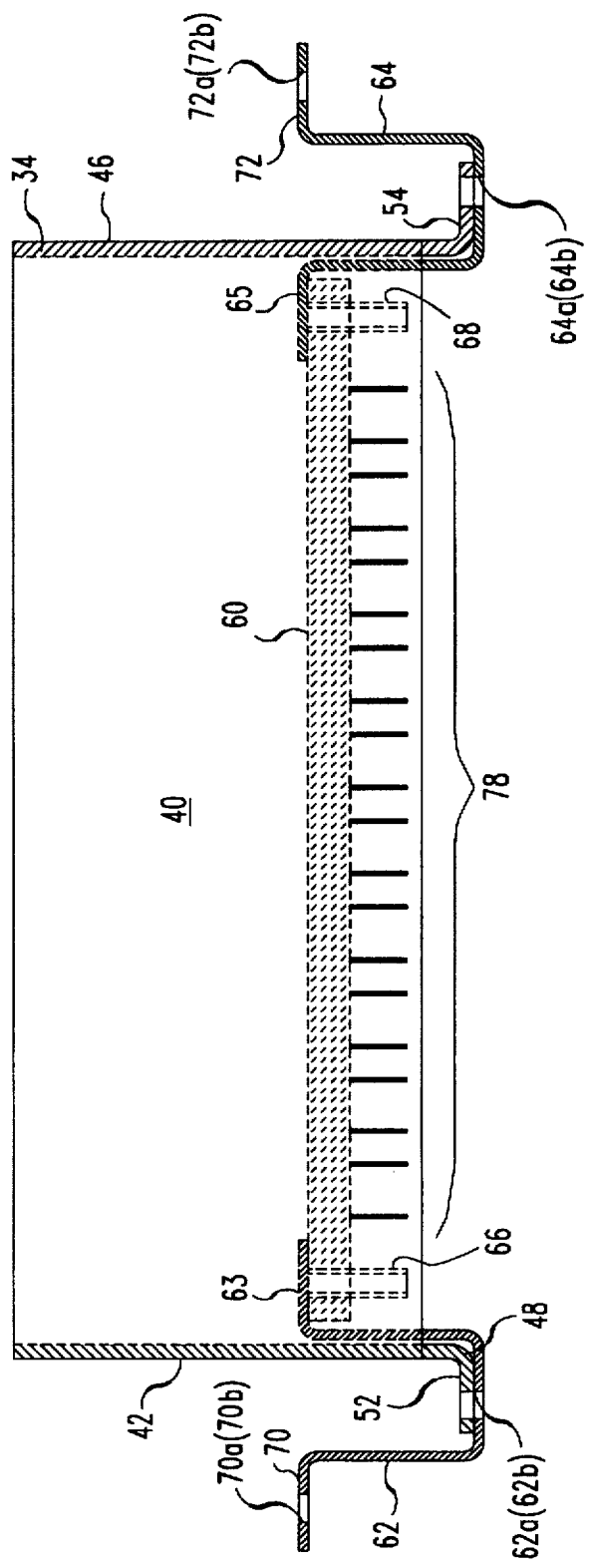
FIG. 4 is an enlarged side view of the panel housing, showing a protector module panel placed inside the panel housing.

FIG. 4 is an enlarged side view of the panel housing 34 in FIG. 3, showing a protector module panel 60 placed in the housing 34. The panel 60 is formed of an electrically insulative material and is in generally rectangular form. The perimeter of the panel 60 extends near the inside bounds of the panel housing 34. A pair of mounting brackets 62, 64 having a generally "U"-shaped cross section, act to hold the panel 60 in place inside the housing 34 when the module panel assembly 20 (FIG. 1) is mounted on the BEP chassis 18, as explained below. Inside flanges 63, 65 of the brackets 62, 64 are fastened on corresponding top side edges of the panel 60, and connect with conductive feed-through sleeves or grommets 66, 68 that project below the bottom surface of the panel 60. The sleeves 66, 68 connect with a ground strap (not shown) parts of which are soldered or otherwise electrically connected to certain ground connection terminals for the modules 36. The main bodies of the "U" brackets 62, 64 receive the bottom portions of the housing side walls 42, 46. Each of the bracket bases has a pair of openings 62a, 62b; 64a, 64b located to register with the openings 56a, 56b; 58a, 58b in the corresponding housing base flanges 52, 54. Outside flanges 70, 72 of brackets 62, 64 have pairs of mounting holes 70a, 70b; 72a, 72b for fasteners used in securing the assembled module panel assembly 20 on the BEP chassis 18 in FIG. 1.

A number of module pin connection terminals 78 project from the bottom surface of the panel 60. The terminals 78 have module pin receiving portions that are retained in corresponding holes in the panel 60, to receive pins of the modules 36 when the modules are inserted in the panel 60. The terminals 78 also have connecting portions which extend below the panel bottom surface in FIG. 4, for connection with wire leads that electrically connect inserted modules with outside wire lines that are brought into splice chamber 22, and with customer lines that are coupled to the bridge terminals 28 and connectors 24 of the BEP terminal 10 in FIG. 1.

Figure 5:
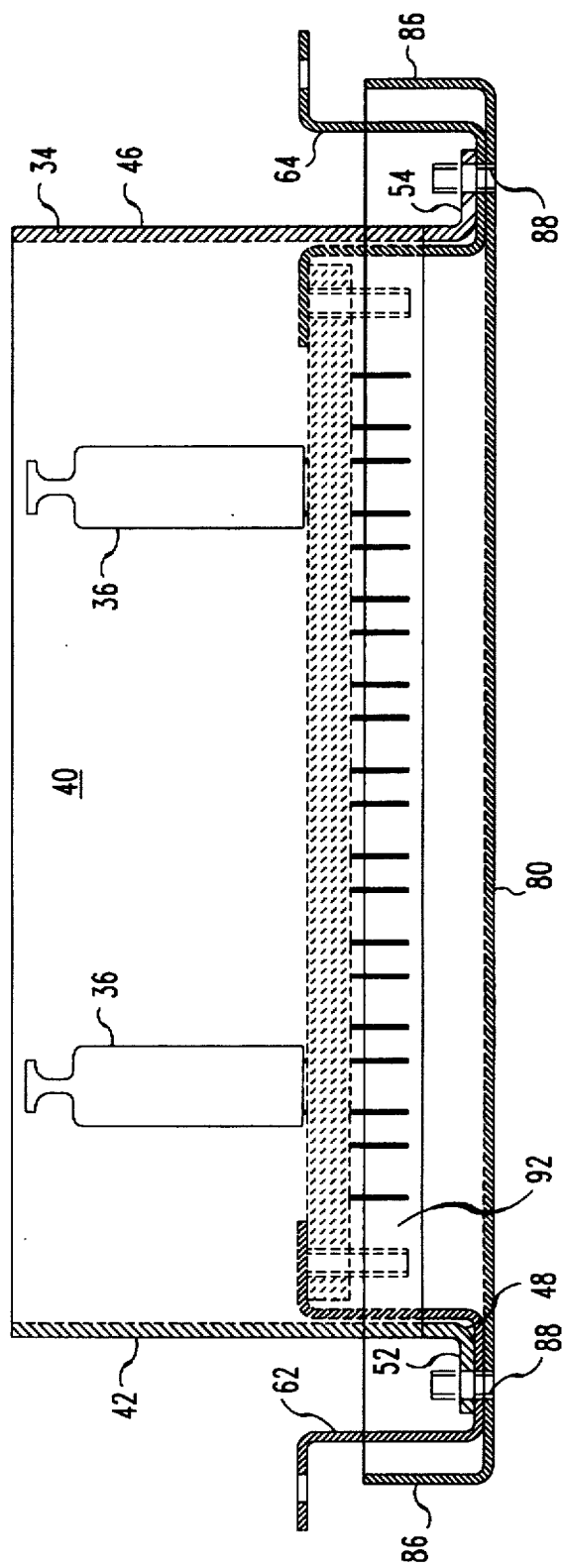
FIG. 5 is side view of the panel housing and module panel as in FIG. 4, showing a sealant pan fixed across a bottom opening of the housing.
Figure 6:
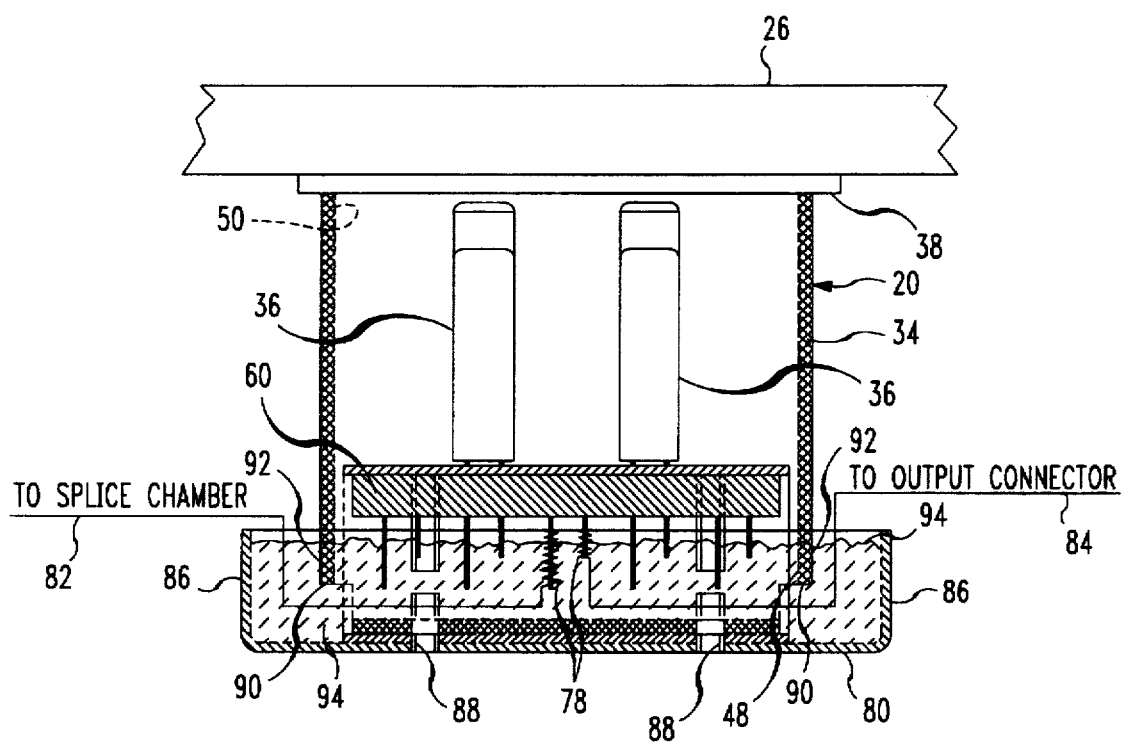
FIG. 6 is an enlarged side view of the panel housing in FIG. 5, showing wire leads connected to terminals on the panel, and a sealant material for protectively shielding the terminals from environmental conditions outside the housing.

FIG. 5 is a side view of the panel housing 34, showing a sealant pan 80 fixed across the bottom opening 48 of the panel housing 34. FIG. 6 is a side view of the panel housing in FIG. 5, showing wire leads 82, 84 connected to corresponding panel connection terminals 78.

The pan 80 has a generally rectangular perimeter that extends beyond the side walls of the panel housing 34, and the bodies of the housing mounting brackets 62, 64. The pan 80 has a wall 86 that defines an interior region of the pan. A set of mounting holes 88 are formed in the base of the pan 80 to align with the mounting holes in the brackets 62, 64 and base flanges 52, 54, associated with the panel 60 and the panel housing 34.

Preferably, before joining the sealant pan 80, mounting brackets 62, 64, and panel housing flanges 52, 54 to one another as shown in FIG. 5, all wire leads such as the leads 82, 84 are wire wrapped or otherwise electrically connected with the panel terminals 78, and dressed near the bottom surface of the panel 60.

After all wire leads are electrically connected to the panel terminals 78, the sealant pan 80 is joined with fasteners to the panel mounting brackets 62, 64 and to the housing 34, as shown in FIGS. 5 and 6. The wire leads are routed through a clearance gap 90 that is defined between the sealant pan 80, and a lower portion 92 of the panel housing 34. Once the wire leads are dressed and routed through the clearance gap 90, a liquid sealant or potting material 94 is poured between the pan wall 86 and the side walls of the panel housing 34, through the clearance gap 90 and into the pan 80 see FIG. 6. One preferred sealant material is a polyurethane "Biwax" resin available from Biwax Corporation, as No. 622A. Appropriate quantities of an accelerator and a hardener may be added to the liquid resin so that after setting a predetermined time at room temperature, the sealant 94 will harden to a state where the module panel assembly 20 is ready to be mounted on the BEP chassis 18 in FIG. 1.

A sufficient quantity of the sealant is, preferably, poured through the clearance gap 90 in FIG. 6 until the clearance gap 90 is filled with the sealant 94. The connecting portions of the panel terminals 78 may be protectively enveloped by the sealant material as well. Thus, the bottom opening 48 of the panel housing is sealed with the result that the terminal connecting portions below the panel 60 and the protector modules 36 mounted above the panel, are all protected from moisture outside the lower portion of the panel assembly 20.

The panel assembly 20 is mounted on the BEP chassis 18 by passing the upper portion of the panel housing 34 through a corresponding opening in the chassis 18 from below the chassis, until the mounting brackets 62, 64 abut the bottom surface of the chassis and the bracket mounting holes align with corresponding openings in the chassis. The mounting brackets 62, 64 are then fastened to the chassis 18, together with a ground bus bar at one or both ends of the assembly 20 atop the chassis 18.

A required number of the protector modules 36 are inserted through the top opening 50 of the panel housing 34, into corresponding module pin sockets defined on the top surface of the module panel 60. When the inside terminal cover layer 26 is closed, the sealing gasket 38 seals the top opening 50 of the panel housing 34 (see FIG. 6). The inserted modules 36 and their pin connections with the panel terminals 78, are thus shielded from moisture outside the upper portion of the panel assembly 20.

While the foregoing description represents a preferred embodiment of the invention, it will be obvious to those skilled in the art that various changes and modifications may be made, without departing from the spirit and scope of the invention as pointed out by the following claims.

What I claim is:

1. A method of protecting electrical connections with terminals on a component mounting panel from environmental conditions, comprising;

placing a component mounting panel having connection terminals inside a housing having side walls, a top opening and a bottom opening;

connecting wire leads to said connection terminals;

placing a pan having a pan wall across the bottom opening of said housing so that the pan wall extends beyond the side walls of the housing, and defining a clearance gap between said pan and a lower portion of said housing;

routing said wire leads from said connection terminals through said clearance gap;

pouring a sealant material between the pan wall and the side walls of the panel housings through said clearance gap and into said pan; and protectively shielding said connection terminals by sealing the bottom opening of said housing with the sealant material.

2. The method of claim 1, including enveloping connecting portions of the connection terminals with said sealant material.

3. The method of claim 1, including sealing the top opening of said housing by placing a top cover part across the top opening, thus protecting components inserted into the panel through said top opening from environmental conditions outside of the housing.

4. A method of protecting electrical connections with terminals on a component mounting panel from environmental conditions, comprising:

placing a component mounting panel having connection terminals inside a housing having a top opening and a bottom opening;

connecting wire leads to said connection terminals;

placing a pan across the bottom opening of said housing and defining a clearance gap between said pan and said housing;

routing said wire leads through said clearance gap;

protectively shielding said connection terminals by sealing the bottom opening of said housing with a sealant material;

sealing the top opening of said housing by placing a top cover part across the top opening; and placing a gasket between said top cover part and said housing.

5. The method of claim 4, including enveloping connecting portions of the connection terminals with sealant material.

6. An environmentally shielded module panel assembly, comprising;

a panel housing having side walls that define a top opening and a bottom opening;

a panel having connection terminals for mounting a number of component modules having pins arranged to plug into openings into the panel so that the pins will make electrical contact with corresponding ones of the connection terminals of the panel;

a mounting arrangement that holds the panel in the panel housing;

a number of wire leads connected to the connection terminals;

a pan supported across the bottom opening of the panel housing, wherein said pan has a pan wall that extends beyond the side walls of the panel housing and a clearance gap is defined between the pan and a lower portion of the panel housing, and the wire leads are routed from the connection terminals through the clearance gap; and a sealant material sealing the bottom opening of the panel housing so that the connection terminals are protectively shielded from environmental conditions outside of the panel housing;

wherein the sealant material is poured between the pan Wall and the side walls of the panel housing, through said clearance gap and into said pan, and allowed to harden.

7. A module panel assembly according to claim 6, including a top cover member adapted to be placed in sealing relation across the top opening of the panel housing.

8. An environmentally shielded module panel assembly, comprising:

a panel housing having a top opening and a bottom opening;

a panel having connection terminals for mounting a number of protector modules having pins arranged to plug into openings in the panel so that the pins will make electrical contact with corresponding ones of the connection terminals of the panel;

a mounting arrangement that holds the panel in the panel housing;

a number of wire leads connected to the connection terminals;

a pan supported across the bottom opening of the panel housing, wherein a clearance gap is defined between the pan and the panel housing, and the wire leads are routed through the clearance gap; and a sealant material filled in said clearance gap so that the connection terminals are protectively shielded from environmental conditions outside of the panel housing;

a top cover member arranged to be placed in sealing relation across the top opening of the panel housing; and a sealing gasket between the top cover member and the panel housing.

9. A module panel assembly according to claim 8, wherein said top cover member is a part of a cover layer of a building entrance protector terminal chassis.

10. A method of protecting electrical connections with terminals on a component mounting panel from environmental conditions, comprising:

placing a component mounting panel having connection terminals inside a housing having a top opening and a bottom opening;

connecting wire leads to said connection terminals;

placing a pan across the bottom opening of said housing and defining a clearance gap between said pan and said housing;

routing said wire leads through said clearance gap;

protectively shielding said connection terminals by filling the clearance gap with a sealant material;

sealing the top opening of said housing by placing a top cover part across the top opening, thus protecting components inserted into the panel through said top opening from environmental conditions outside of the housing; and placing a gasket between said top cover part and said housing.

* * * * *